United States Patent [19]

Dworak et al.

[11] 4,431,780

[45] Feb. 14, 1984

[54] LOW SOLVENT, WATER-DILUTABLE BINDERS FOR AIR DRYING COATING COMPOSITIONS

[75] Inventors: Gert Dworak; Wolfgang Daimer; Heinrich Lackner, all of Graz, Austria

[73] Assignee: Vianova Kunstharz, A.G., Werndorf, Austria

[21] Appl. No.: 381,854

[22] Filed: May 25, 1982

[30] Foreign Application Priority Data

May 29, 1981 [AT] Austria .................................. 2403/81

[51] Int. Cl.$^3$ ............................................. C08G 63/76
[52] U.S. Cl. ................................ 525/444.5; 106/250; 106/251
[58] Field of Search ..................... 525/444.5; 106/250, 106/251

[56] References Cited

U.S. PATENT DOCUMENTS 2,459,176 1/1949 Moore ................................. 106/250
3,565,839 2/1971 Bender ............................. 525/444.5
4,171,294 10/1979 Dhein ............................. 525/444.5

Primary Examiner—Paul R. Michl
Attorney, Agent, or Firm—A. W. Breiner

[57] ABSTRACT

Water-dilutable binders for air drying coating compositions, the content of the auxiliary organic solvent being below 15% of the binder solids are described. The binders comprise the partial condensation products of (A) 30–70% by weight of a film forming fatty acid modified alkyl resin intermediate with an acid value of between 30 and 200 mg KOH/g, an intrinsic viscosity $\zeta_A$ of from 4.5 to 8 ml/g and an oil length of from 5 to 60%, with (B) 70–30% by weight of a film forming fatty acid modified alkyl resin intermediate with an acid value of below 5 mg KOH/g, a hydroxyl value of from 50 to 300 mg KOH/g, an intrinsic viscosity $\zeta_B$ of from 8 to 12 ml/g and an oil length of from 5 to 60%, the ratio between the intrinsic viscosities $\zeta_B/\zeta_A$ lying between 1.4 and 2.7. Solutions of the binders ready for application are obtained which have a high solids content.

4 Claims, No Drawings

LOW SOLVENT, WATER-DILUTABLE BINDERS FOR AIR DRYING COATING COMPOSITIONS

The invention is concerned with a water-dilutable binder for air drying coating compositions, the content of auxiliary organic solvent being below 15% of binder solids. The coating compositions are based on fatty acid modified alkyd resins.

"Water-dilutable binders," as the term is used herein, means polycarboxylic acid resins which can be rendered water soluble through at least partial salt formation with ammonia or amines.

The acceptance of water-dilutable binders as a protective coating which are used in the formulation of air drying paints which can be used for professional and industrial use and for the do-it-yourself sector, is hindered by abnormal viscosity curve of the binders known in the art (E. Hüttmann, *Plaste und Kautschuk* 17,202, 1970). This abnormal viscosity curve is the reason why only solutions having a low solids content on the further dilution down to application viscosity for spraying or dipping are possible. The obtained films are thin and thus require several coatings to obtain an adequate protective coating. Many suggestions have been made to overcome this deficiency including, on the one hand, the co-employment of very high levels of auxiliary organic solvents and, on the other hand, polyalkylene glycols are to be built into the resins (DT-AS No. 12 03 407). The first measure is going away from the primary of water-soluble binders, and the second, in many cases, leads to films with unsatisfactory water resistance.

AT-PS No. 328 587 discloses aqueous coating compositions for baking coating compositions which are obtained by blending or partially condensing a polycarboxylic acid resin, a polyhydroxy compound, and a hardening component, such as an amine resin. Through judicial choice of the reaction partners, products may be obtained which do not show the above-mentioned disadvantages with regard to viscosity decline. However, the process disclosed is not possible with products containing high levels of oxidizing oil fatty acids as is the case with air drying binders. Through the higher level of hydrophobic compounds further essential criteria are necessary in order to achieve satisfactory products.

It is the primary objective of the present invention to provide water-dilutable binders which are air drying at ambient temperature, or which can be force-dried, on the basis of oil modified alkyd resins carrying carboxy groups and having an oil length of from 30 to 60%. "Oil length," as the term is used herein, is the content of oxidizing drying fatty acids or fatty acid radicals, expressed as percent by weight, in the intermediate or the final product.

In general, the primary objective is realized through a specific choice of the essential specific figures for the intermediate and the final product.

The present invention is concerned with low solvent containing binders for air drying coating compositions, water dilutable upon partial or total salt formation with ammonia or an amine on the basis of fatty acid modified alkyd resins with an oil length of from 30 to 60% and an intrinsic viscosity of between 10 and 15 ml/g (measured on a 2% solution in N,N-dimethylformamide, at 20° C.), which are obtained through partial condensation at elevated temperature of (A) 30–70% by weight of a film forming fatty acid modified alkyd resin intermediate with an acid value of between 30 and 200 mg KOH/g, an intrinsic viscosity of $\zeta_A$ of from 4.5 to 8 ml/g and an oil length of from 5 to 60%, with (B) 70–30% by weight of a film forming fatty acid modified alkyd resin intermediate with an acid value of below 5 mg KOH/g, a hydroxyl value of from 50 to 300 mg KOH/g, an intrinsic viscosity $\zeta_B$ of from 8 to 12 ml/g and an oil length of from 5 to 60%, the ratio between the intrinsic viscosities $\zeta_B/\zeta_A$ lying between 1.4 to 2.7.

The coatings prepared from the binders obtained according to the invention, upon customary addition of siccatives, show very fast drying at room temperature, radiant brilliance and excellent water resistance. Pigment compatibility is excellent, no flocculation could be observed. It could not be forseen that these characteristics would be obtained, because the components A and B themselves, although both film forming, do not have the aforesaid properties.

Through the partial condensation it is possible to integrate the water insoluble component (B) into a water soluble resin compound. It is surprising that despite the high molecular weight—expressed as intrinsic viscosity of from 10 to 15 ml/g—and the low acid value of the total system of from 25 to 70 mg KOH/g, preferably 25 to 40 mg KOH/g, water dilutability is sufficiently good whereby paints can be formulated which combine a high solids content with a sufficiently low application viscosity. Thus, with the application of a single coat the dry film thickness is satisfactory. The auxiliary solvent, optionally added, primarily serves as a processing aid and should not exceed 15% by weight of the binder. Preferably, less than 10% by weight of auxiliary solvent is used.

Components (A) and (B), in their composition as used herein, are known alkyd resins and are described, for example, in "Ullmann Encyklopädie der Technischen Chemie," 4th edition, Volume 15, chapter "Paints." The methods of preparation and appropriate raw materials are known to those skilled in the art. In place of the natural oils or their fatty acids, it is evident that synthetic drying oils such as carboxy groups containing polydiene oils may be used for the alkyd intermediates. Furthermore, the alkyd resins may be modified through methods known in the art, as for example with isocyanates or copolymerizable monomers.

The essential characteristics for the binders of the invention are the ranges of the specific values as follows:

| | Component (A) | Component (B) |
|---|---|---|
| Acid value (mg KOH/g) | 30–200 | below 5 |
| Hydroxyl value (mg KOH/g) | 0–200 | 50–300 |
| Intrinsic viscosity (ml/g) (2% in N,N—dimethylformamide) | 4.5–8 | 8–12 |
| Oil length (%) | 5–60 | 5–60 |
| Water dilutability (upon total neutralization with triethylamine) | infinitely (clear to opaque solution) | insoluble |
| Film forming with driers | yes | yes |

"Infinite water dilutability" as used herein means that a solution neutralized with triethylamine and diluted down to 10% by weight with water does not form insoluble precipitates after 1 hour.

The condensation between components (A) and (B) is carried out at between 90° to 145° C. Care should be exercised that the reaction blend does not surpass the soluble state. The weight ratios between the components lie between 30 to 70% by weight for component (A) and between 70 to 30% by weight for component (B). It is essential that the quotient of the intrinsic viscosity values of components (A) and (B) is 1 to 1.4–2.7, that means that the intrinsic viscosity of component (B) if 1.4 to 2.7 times higher than that of component (A) and that the intrinsic viscosity of the final product ranges between 10 and 15 ml/g. In this phase of condensation the solvents optionally contained in the intermediates are totally or partially removed from the reaction mass through distillation. In order to obtain the desired results it is of essential importance to keep within the given ranges for the intrinsic viscosity. The method for determining the intrinsic viscosity and the fundamental theory are given in "Ullmanns Encyklopädie der Technischen Chemie," 3rd edition, Volumn II/1, chapter "Viscosimetrie."

The carboxy groups of the binders can be neutralized with ammonia, aliphatic tertiary alkyl and alkanolamines, preferably with triethylamine or N,N-dimethylethanolamine. The optionally pigmented paints are applied in normal manner, through brushing, spraying, dipping, flow coating or analogous application methods. Depending on the selection of the raw materials, with the aid of these binders, anticorrosive paint or finishes can be formulated.

The coatings dry at ambient temperature, upon addition of appropriate driers. It is evident that they also may be force-dried at from 60°–80° C.; when used in conjunction with amine or phenolic resins, they may be stoved at from 140° to 180° C.

The following examples illustrate the invention. All figures given in parts or percentages refer to weight, unless otherwise stated.

Preparation of Component (A)

(A1) 540 parts of pentaerythritol, 480 parts of isophthalic acid, 1150 parts of linoleic oil fatty acid and 178 parts of p-tert. butyl benzoic acid are esterified at 220° C. to an acid value of below 5 mg KOH/g and are then reacted at 110° C. with 471 parts of tetrahydrophthalic anhydride. As soon as the acid value has fallen to about 70 mg KOH/g, the batch is diluted to 95% solids with toluene and down to 85% solids with methylethylketone. The intrinsic viscosity of the product is 6.3 ml/g. After neutralization with triethylamine a sample becomes nearly clear. The oil length of the intermediate is 44%.

(A2) 540 parts of pentaerythritol, 513 parts of tetrahydrophthalic acid, 575 parts of linoleic oil fatty acid, 575 parts dehydrated castor oil fatty acid, 178 parts of p-tert, butyl benzoic acid and 21 parts of neopentylglycol are esterified at 220° C. to an acid value of below 5 mg KOH/g and thereafter reacted at 160° C. with 595 parts of trimellitic anhydride. As soon as the acid value has fallen to 124 mg KOH/g, the batch is diluted at 90° C. with toluene to a solids content of 95% and with methylethylketone down to 85%. The intrinsic viscosity is 6.7 ml/g. Upon neutralization with triethylamine a sample is nearly clear. The oil length of the intermediate is 41%.

Preparation of Component (B)

(B1) 540 parts of pentaerythritol, 480 parts of isophthalic acid, 530 parts of linoleic oil fatty acid, 530 parts of dehydrated castor oil fatty acid and 178 parts of p-tert. butyl benzoic acid are esterified at 230° C. to an acid value of below 5 mg KOH/g and then condensed to an intrinsic viscosity of 10.6 ml/g. The efflux time, DIN 53 211/20° C. of a 50% solution in monoethyleneglycol monobutylether is 93 s. The intermediate has a calculated hydroxyl value of 144 mg KOH/g.

(B2) 32 parts of isomeric acid, 168 parts of dehydrated castor oil fatty acid, 136 parts of pentaerythritol and 120 parts of isophthalic acid are esterified at 230° C. to an acid value of below 5 mg KOH/g and condensed further to an intrinsic viscosity of 9.5 ml/g. The efflux time, DIN 53 211/20° C. of a 50% solution in monoethyleneglycol monobutylether is 85 s. The intermediate has a calculated hydroxyl value of 237 mg KOH/g.

| Analogous to components A1 and B1 intermediates are prepared with the composition as listed below. | | | | | | | | |
|---|---|---|---|---|---|---|---|---|
| Component | Penta-erythritol | Isophthalic Acid | Linolic Oil Fatty Acid | Dehydrated Castor Oil Fatty Acid | Tall Oil* Fatty Acid | p.tert. butylbenzoic Acid | Neopentylglycol | Tetrahydrophthalic Acid |
| A 3 | 540 | 397 | — | 855 | 855 | — | — | 471 |
| A 4 | 540 | 513 | 881 | — | — | 349 | 21 | 471 |
| A 5 | 540 | 349 | 855 | — | 855 | 107 | — | 471 |
| B 3 | 136 | 104 | 140 | 140 | — | — | — | — |
| B 4 | 540 | 513 | 178 | 357 | 178 | 399 | 21 | — |

*rosin acid content ca. 2%

The intermediates have the following characteristics:

| Intermediates: | A 3 | A 4 | A 5 | B 3 | B 4 |
|---|---|---|---|---|---|
| Acid value mg KOH/g | 60 | 74 | 58 | <5 | <5 |
| Intrinsic viscosity ml/g | 5.8 | 6.5 | 4.7 | 10.8 | 10.7 |
| Oil length % | 58 | 34 | 57 | 58 | 35 |
| Hydroxyl value mg KOH/g | — | — | — | 198 | 153 |

EXAMPLE 1

60 parts of Component (B1) and 47 parts (40 parts resin solids) of Component (A1) are heated to 130° C., with the solvent being distilled off, and condensed until the intrinsic viscosity is 12.5 ml/g. The acid value falls from 33 mg KOH/g to 28.2 mg KOH/g. The batch is cooled to 85° C. and diluted with a blend of 11 parts of monoethyleneglycol monobutylether, 4.8 parts of triethylamine and 111.2 parts of deionized water to a solids content of 44%. The pH-value of a 10% aqueous solution is approximately 9. The final product has an oil length of 48%; the ratio between the intrinsic viscosities of the intermediates is $\zeta B/\zeta A = 1.68$.

EXAMPLE 2

50 parts of Component (B2) and 58.8 parts of Component (A2) (50 parts resin solids) are heated to 130° C. under vacuum and with solvent distillation and condensed until the intrinsic viscosity has attained a value of 13.5 ml/g. The acid value of the condensation product is 58 mg KOH/g. The batch is cooled to 80° C. and diluted with a blend of 9.2 parts of triethylamine and 118 parts of deionized water to a solids content of 44%. The pH-value of a 10% aqueous solution is above 8.5. The final product has an oil length of 41%; the ratio between the intrinsic viscosities of the intermediates $\zeta B/\zeta A$ is 1.41.

EXAMPLES 3-5

In Examples 3-5 components A and B are condensed according to the method set forth in Example 2 in the ratios listed below. As soon as the given intrinsic viscosity is attained they are neutralized with triethyl amine (degree of neutralization about 100%) and are diluted with deionized water to a solids content of 44%.

| Example | 3 | 4 | 5 |
|---|---|---|---|
| Blending ratio A/B (Parts) | A4 45/B4 55 | A3 50/B3 50 | A5 70/B4 30 |
| Acid value mg KOH/g | 35 | 26 | 41 |
| Intrinsic viscosity ml/g | 11.8 | 14.8 | 10.2 |
| Oil length percent (%) | 35 | 58 | 50 |
| $\frac{\zeta B}{\zeta A}$ | 1.65 | 1.86 | 2.23 |

Paint Performance Evaluation Of The Binders Of The Invention

Two paints were prepared according to the listed formulations. The mill pastes listed in the first section were obtained through dispersion for 1 hour in a pearl mill. The paint was finished by adding the rest of the listed ingredients in the given sequence and dispersing the whole blend with a high speed dispenser.

| | Formula 1 | Formula 2 |
|---|---|---|
| Titanium Dioxide Pigment (Kronos RN 59) | 24 | 24 |
| Violet Pigment (Hostaperm Violett RL) | 3 | 3 |
| Blue Pigment (Hostaperm Blau AFL) | 13.5 | 13.5 |
| Carbon Black (LTD) | 1.5 | 1.5 |
| Binder of Example 1, 44% | 80 | — |
| Binder of Example 3, 44% | — | 80 |
| Deionized Water | 20 | 20 |
| Pigment Paste | 142 | 142 |
| Binder of Example 1, 44% | 586.7 | — |
| Binder of Example 3, 44% | — | 586.7 |
| Triethylamine | 3.0 | 3.0 |
| Driers: | | |
| Co (Octa-Soligen, 1% WS) | 14.9 | 14.9 |
| Pb (Octa-Soligen, 10% WS) | 14.9 | 14.9 |
| Ca (Octa-Soligen, 2% WS) | 14.9 | 14.9 |
| Paint Additives: | | |
| Antiskinning Aid (Additol XL 297) | 7.7 | 7.7 |
| Levelling Aid (Additol XL 121) | 1.5 | 1.5 |
| Deionized Water | 285.5 | 76.2 |
| Paint I | 1071.1 | — |
| Paint II | — | 861.6 |
| Paint Solids % | 31.9 | 39.7 |
| pH-Value | 9.3 | 9.5 |
| Water Content of Paint, % | 58.7 | 48.7 |
| Organic Solvents and Amine | 9.4 | 11.6 |

Paints I and II, after having been allowed to stand for 24 hours, upon dilution with water to application viscosity, were applied by a spray gun to glass plates and to clean steel plates and allowed to dry at room temperature (20° C./60% relative humidity). Evaluation of the films of about 30 μm dry film thickness gave the following values:

| | Paint I | Paint II |
|---|---|---|
| Tack-free, Hours | 3½ | 1½ |
| KONIG Pendulum Hardness DIN 53 157, Seconds | | |
| (a) After 24 Hours | 24 | 49 |
| (b) After 1 Week | 42 | 75 |
| (c) After 3 Weeks | 42 | 75 |
| (d) After 4 Weeks | 45 | 82 |
| Gloss, 20° Gonioreflectometer | 69% | 86% |
| Cross-hatch DIN 53 151 | | |
| (a)–(d) | Gt 0 | Gt 0 |
| Impact (Joule) | 9.04 | 1.13 |

As will be apparent to one skilled in the art, various modifications can be made within the scope of the aforesaid description. Such modifications, being within the ability of one skilled in the art, form a part of the present invention and are embraced by the appended claims.

It is claimed:

1. Low solvent air drying binders for air drying coating compositions which are water dilutable upon partial or total salt formation with ammonia or an amine and have an oil length of from 30 to 60% and an intrinsic viscosity of between 10 and 15 ml/g, comprising the partial condensation at elevated temperature of
(A) 30–70% by weight of a film forming fatty acid modified alkyd resin intermediate with an acid value of between 30 and 200 mg KOH/g, an intrinsic viscosity $\lambda_A$ of from 4.5 to 8 ml/g and an oil length of from 5 to 60%, with
(B) 70–30% by weight of a film forming fatty acid modified alkyd resin intermediate with an acid value of below 5 mg KOH/g, a hydroxyl value of from 50 to 300 mg KOH/g, an intrinsic viscosity $\lambda_B$ of from 8 to 12 ml/g and an oil length of from 5 to 60%, the ratio between the intrinsic viscosities $\lambda_B/\lambda_A$ lying between 1.4 to 2.7.

2. Coating compositions according to claim 1 wherein said binder has an acid value of between 25 to 70 mg KOH/g.

3. Coating compositions according to claim 1 wherein said binder has an acid value of between 25 to 40 mg KOH/g.

4. Coating compositions according to claims 1, 2 or 3 wherein components (A) and (B) are condensed at from 90° to 145° C. until the desired intrinsic viscosity is attained.

* * * * *